United States Patent
Cai

(10) Patent No.: US 12,317,995 B1
(45) Date of Patent: Jun. 3, 2025

(54) BRACKET ASSEMBLY AND ELECTRONIC DEVICE BRACKET

(71) Applicant: Dongguan Kaishuo Electronics Technology Co., Ltd., Dongguan (CN)

(72) Inventor: Jing Cai, Dongguan (CN)

(73) Assignee: Dongguan Kaishuo Electronics Technology Co., Ltd., Dongguan (CN)

( * ) Notice: Subject to any disclaimer, the term of this patent is extended or adjusted under 35 U.S.C. 154(b) by 0 days.

(21) Appl. No.: 18/732,483

(22) Filed: Jun. 3, 2024

(30) Foreign Application Priority Data

Nov. 20, 2023 (CN) .......................... 202323124777.2

(51) Int. Cl.
*A47B 23/04* (2006.01)
*F16M 13/02* (2006.01)

(52) U.S. Cl.
CPC ........... *A47B 23/044* (2013.01); *F16M 13/02* (2013.01)

(58) Field of Classification Search
CPC .................................................... A47B 23/044
USPC .............................. 248/349.1, 346.06, 346.5
See application file for complete search history.

(56) References Cited

U.S. PATENT DOCUMENTS

| | | | | |
|---|---|---|---|---|
| 5,337,062 A | * | 8/1994 | Sherwood | H01Q 1/3275 343/765 |
| 5,646,638 A | * | 7/1997 | Winegard | H01Q 1/08 343/882 |
| 7,325,875 B1 | * | 2/2008 | Guerrini | A47C 4/52 297/344.21 |
| 8,544,809 B1 | * | 10/2013 | Laurita | F16M 13/022 297/344.21 |
| 2014/0265459 A1 | * | 9/2014 | Gambino | A47C 4/10 297/16.1 |
| 2015/0257288 A1 | * | 9/2015 | Livernois | H04B 1/3877 248/346.06 |
| 2019/0365074 A1 | * | 12/2019 | Kikuchi | A45D 33/006 |

* cited by examiner

*Primary Examiner* — Alfred J Wujciak

(57) ABSTRACT

The present application discloses a bracket assembly, which includes a base, a first bracket, a rotation seat and a second bracket. The first bracket is swingably mounted to the base and swingable or foldable relative to the base, to facilitate providing an inclined angle between the first bracket and the base, thereby contacting a tabletop or supporting a tabletop through the first bracket. In addition, the second bracket achieves the rotation function relative to the base through the rotation seat, to facilitate that the second bracket has the rotation function, and the second bracket is foldably mounted to the rotation seat and openable and foldable relative to the rotation seat, and when the second bracket is folded relative to the rotation seat, the second bracket is held by the user's hand.

8 Claims, 4 Drawing Sheets

BRACKET ASSEMBLY AND ELECTRONIC DEVICE BRACKET

CROSS-REFERENCE TO RELATED APPLICATIONS

The present application claims priority to Chinese Application No. 202323124777.2, filed Nov. 20, 2023, the entire disclosure of which is incorporated herein by reference.

TECHNICAL FIELD

The present application relates to the technical field of bracket assemblies, and specifically to a bracket assembly and an electronic device bracket.

BACKGROUND

With the development of science and technology, the electronic device bracket is used in human's lives, the bracket assembly, as part of the electronic device bracket, is used to support electronic products. In the existing technology, the bracket assembly includes a base and a bracket, the bracket is connected to the base, at this time, the bracket is in a fixed state relative to the base for supporting the electronic products, but the existing bracket assembly is only used for support, resulting in a poor functionality of the existing bracket assembly.

SUMMARY

Embodiments of the present application provide a bracket assembly and an electronic device bracket, the bracket assembly is compatible with a first bracket and a second bracket, the first bracket is swingably mounted to a base and is swingable or foldable relative to the base, such that there is an inclined angle between the first bracket and the base, thus the first bracket contacts a tabletop or supports the tabletop, so as to facilitate that the bracket assembly contacts the tabletop or supports tabletop, so as to maintain the inclined state of the bracket assembly and the electronic device connected to the bracket assembly. Furthermore, the second bracket achieves a rotation function with the base through the rotation seat, so that the second bracket has a rotation function, and the second bracket is foldably mounted to the rotation seat and openable or foldable relative to the rotation seat. When the second bracket is opened relative to the rotation seat, the second bracket is held by a user's hand, so as to facilitate the user holding the bracket assembly and the electronic device connected to the bracket assembly, whereby the bracket assembly is compatible with the support function of the first bracket and the handhold function of the second bracket, which enriches the function of the bracket assembly and satisfies the comprehensive application of the first bracket and the second bracket. In addition, when the second bracket is folded relative to the rotation seat, the second bracket is fixed to the rotation seat by adsorption force or snap fit force, the folding stability between the second bracket and the rotation seat is ensured.

Other features and advantages of the present application will become apparent by the following detailed description, or will partly be learned by practice of the present application.

According to an aspect of the embodiment of the present application, it provides a bracket assembly, including:

a base, connecting an electronic device or a support member;

a first bracket, swingably mounted to the base and swingable or foldable relative to the base;

a rotation seat, rotatably mounted to the base and rotatable along an axis of the rotation seat; and a second bracket, arranged along the axis of the rotation seat relative to the rotation seat, wherein the second bracket is foldably mounted to the rotation seat and openable and foldable relative to the rotation seat, and when the second bracket is folded relative to the rotation seat, the second bracket is fixed to the rotation seat by adsorption force or snap fit force.

In an embodiment, the base is provided with a rotation hole and a through hole, and the rotation hole is located on an outside of the through hole and communicated with the through hole;

the rotation seat is located inside the through hole, the rotation seat is connected to the rotation hole, and a gap is provided between the rotation seat and the rotation hole for rotatable relative to the rotation hole; or the rotation seat is located inside the through hole, a rotation bearing is provided between the rotation hole and the rotation seat, and the rotation seat is rotatable relative to the rotation hole through the rotation bearing.

In an embodiment, a rotation arm is projected from a peripheral side wall of the rotation seat, the rotation arm is inserted in the rotation hole and rotatable within the rotation hole, and an upper side wall of the rotation arm is contacted with an inner side wall of the rotation hole.

In an embodiment, when the first bracket is folded relative to the base, the first bracket is provided with a through hole, and the second bracket is exposed to the through hole, and the second bracket is located inside the first bracket and is opened or folded relative to the rotation seat.

In an embodiment, the first bracket is provided with an operation hole, the operation hole is provided on an outer peripheral side of the through hole and communicated with the through hole; and when the first bracket is folded relative to the base, an operation space is formed between an inner side wall of the operation hole and an outer peripheral wall of the second bracket, the operation space is configured for insertion of a user's hand to open the second bracket.

In an embodiment, when the first bracket is folded relative to the base, and a surface of the second bracket extends not beyond a surface of the first bracket along an axis of the second bracket.

In an embodiment, the second bracket is provided with a folding member between the second bracket and the rotation seat, and an end of the folding member is connected to the second bracket and another end of the folding member is connected to the rotation seat;

the folding member include at least one folding arm, each folding arm is provided with a first folding portion and a second folding portion connected to each other, the first folding portion is connected to the rotation seat, and the second folding portion is connected to the second bracket, and the first folding portion and second folding portion are openable or foldable each other.

In an embodiment, when the folding arm is opened, and a bent is formed between the first folding portion and the second folding portion, the first folding portion, the second folding portion, the rotation seat and the second bracket form a handhold space for insertion of the user's hand or clamping the user's hand.

In an embodiment, when the folding arm is folded, the rotation seat and the second bracket are folded to each other and are subjected to adsorption force or snap fit force An electronic device bracket includes the bracket assembly and an electronic device, the bracket assembly is located on an outside of the electronic device, the base of the bracket assembly is magnetically or adhesively connected to the electronic device.

In the technical solutions provided by some embodiments of the present application, the bracket assembly is compatible with a first bracket and a second bracket, the first bracket is swingably mounted to a base and is swingable or foldable relative to the base, such that there is an inclined angle between the first bracket and the base, thus the first bracket contacts a tabletop or supports the tabletop, so as to facilitate that the bracket assembly contacts the tabletop or supports tabletop, so as to maintain the inclined state of the bracket assembly and the electronic device connected to the bracket assembly. Furthermore, the second bracket achieves a rotation function with the base through the rotation seat, so that the second bracket has a rotation function, and the second bracket is foldably mounted to the rotation seat and openable or foldable relative to the rotation seat. When the second bracket is opened relative to the rotation seat, the second bracket is held by a user's hand, so as to facilitate the user holding the bracket assembly and the electronic device connected to the bracket assembly, whereby the bracket assembly is compatible with the support function of the first bracket and the handhold function of the second bracket, which enriches the function of the bracket assembly and satisfies the comprehensive application of the first bracket and the second bracket. In addition, when the second bracket is folded relative to the rotation seat, the second bracket is fixed to the rotation seat by adsorption force or snap fit force, the folding stability between the second bracket and the rotation seat is ensured.

It should be understood that the above general description and the detailed description that follows are merely exemplary and explanatory, and do not limit the present application.

BRIEF DESCRIPTION OF THE DRAWINGS

The accompanying drawings herein are incorporated into and form a part of the specification, illustrate embodiments in accordance with the present application, and are used in conjunction with the specification to explain the principles of the present application. It will be apparent that the accompanying drawings in the following description are only some of the embodiments of the present application, and that other accompanying drawings may be obtained from these drawings without creative labour for those skilled in the art. In the accompanying drawings.

DETAILED DESCRIPTION OF THE EMBODIMENTS

Embodiments will now be described more fully with reference to the accompanying drawings. However, the embodiments can be implemented in a variety of forms and should not be construed as being limited to the examples set forth herein; rather, the provision of these embodiments allows the present application to be more comprehensive and complete and conveys the idea of the embodiments in a comprehensive manner to those skilled in the art.

In addition, the described features, structures, or characteristics may be combined in one or more embodiments in any suitable manner. In the following description, many specific details are provided thereby giving a full understanding of the embodiments of the present application. However, those skilled in the art will realize that it is possible to practice the technical embodiments of the present application without one or more of the specific details, or that other methods, components, devices, steps, etc. may be employed. In other instances, publicly known methods, devices, implementations, or operations are not shown or described in detail to avoid obscuring aspects of the present application.

The block diagrams shown in the accompanying drawings are merely functional entities and do not necessarily have to correspond to physically separate entities. That is, the functional entities may be implemented in software form, or in one or more hardware modules or integrated circuits, or in different networks and/or processor devices and/or microcontroller devices.

The flowcharts shown in the accompanying drawings are only exemplary illustrations and it is not necessary to include all elements and operations/steps, nor necessary to perform them in the order depicted. For example, some of the operations/steps may also be decomposed, and some of the operations/steps may be combined or partially combined, so that the actual order of execution may change according to the actual situation.

Figure 1:
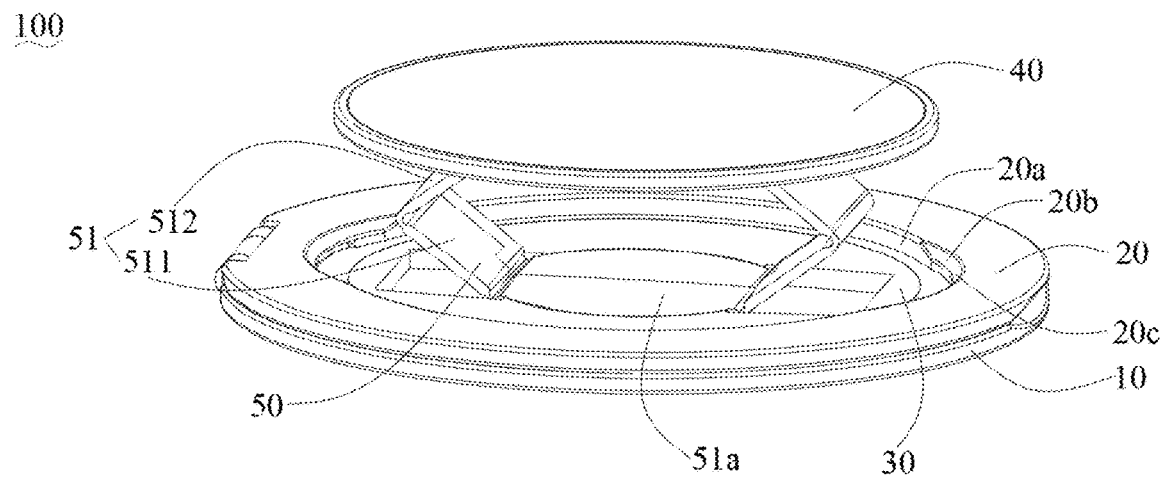
FIG. 1 is a schematic view of a bracket assembly according to an embodiment of the present application.
Figure 2:
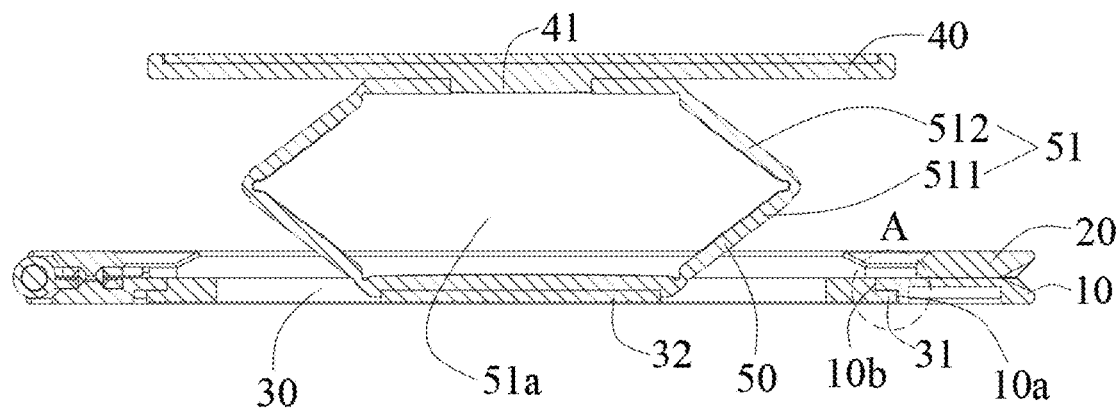
FIG. 2 is a cross-sectional view of the bracket assembly according to an embodiment of the present application.
Figure 3:
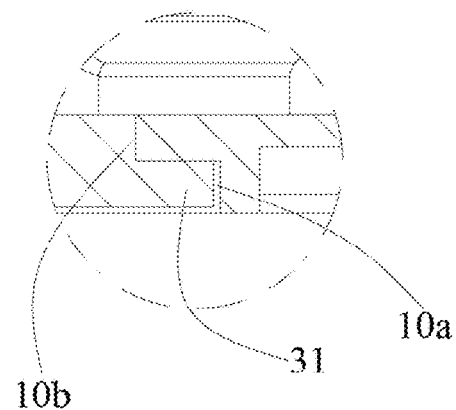
FIG. 3 is a partially enlarged view at A in FIG. 2.
Figure 4:
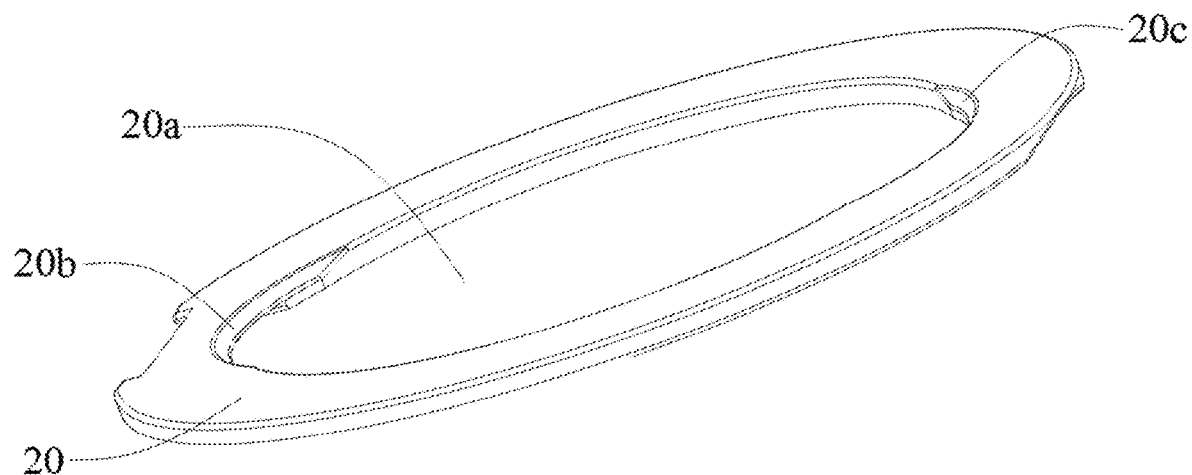
FIG. 4 is a schematic view of a first bracket of the bracket assembly according to an embodiment of the present application.
Figure 5:
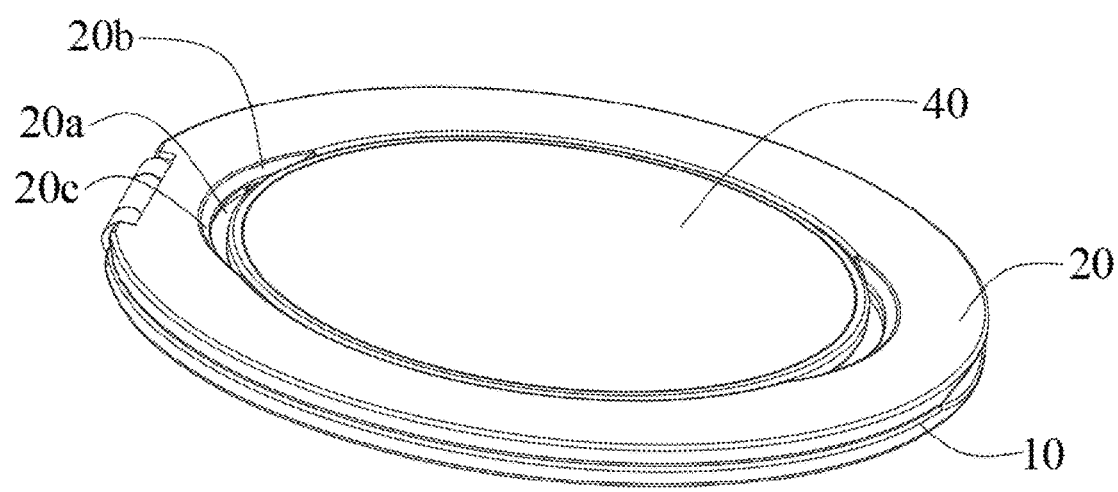
FIG. 5 is a schematic view of a folded state of the bracket assembly according to an embodiment of the present application.
Figure 6:
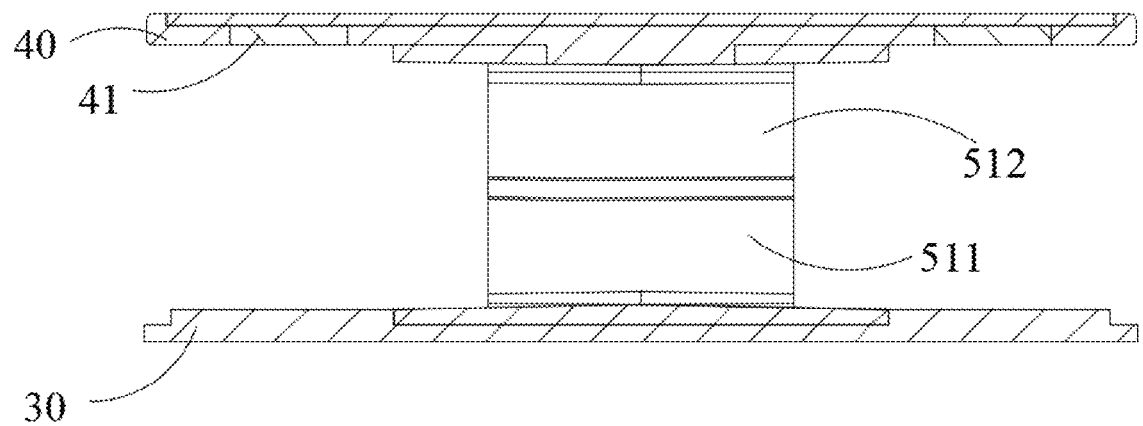
FIG. 6 is a schematic diagram of a magnetic attraction of a second connection member to a rotation seat of the bracket assembly according to an embodiment of the present application.
Figure 7:
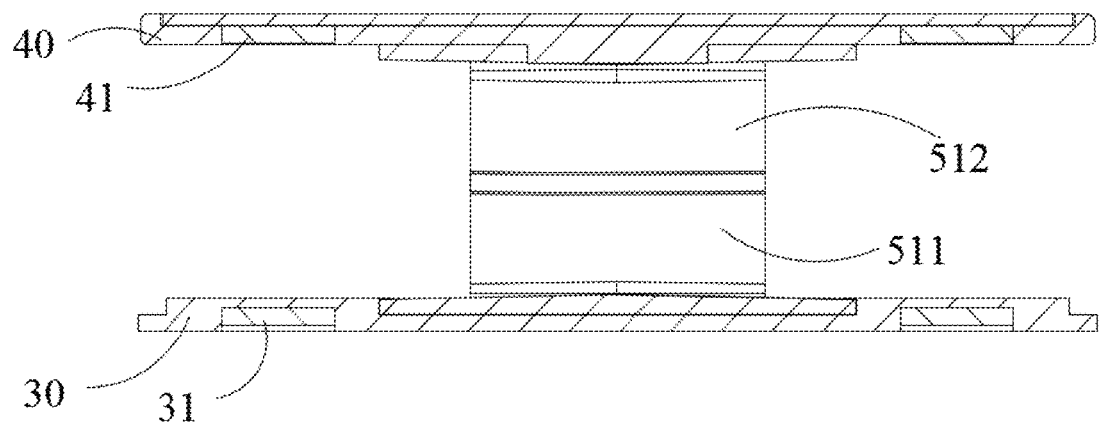
FIG. 7 is a schematic diagram of a magnetic attraction of a first connection member to the second connection member of the bracket assembly according to an embodiment of the present application.
Figure 8:
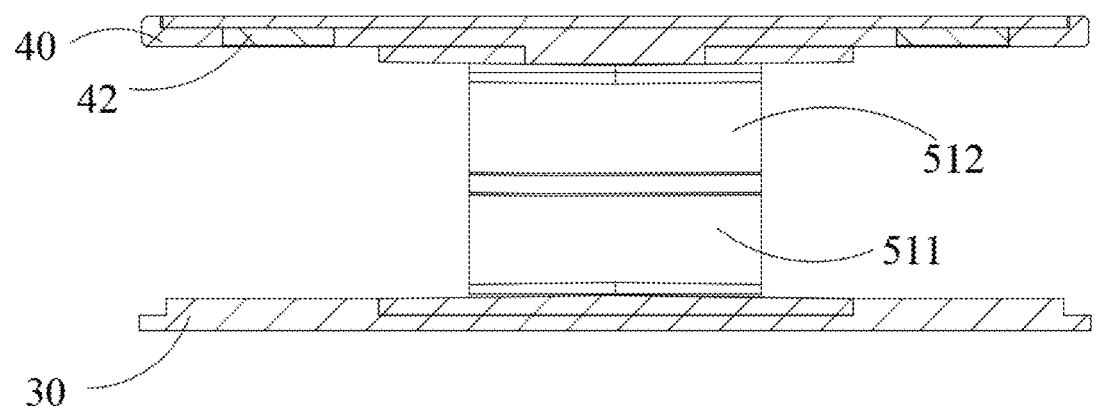
FIG. 8 is a schematic diagram of adhesion of a fourth connection member to the rotation seat of the bracket assembly according to an embodiment of the present application.
Figure 9:
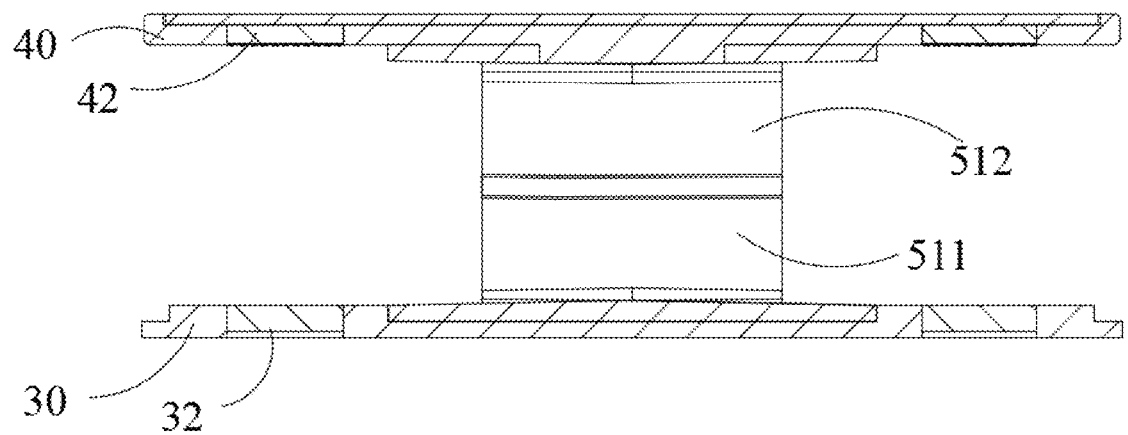
FIG. 9 is a schematic diagram of adhesion of the fourth connection member to a third connection member of the bracket assembly according to an embodiment of the present application.

Referring to FIGS. 1 to 9, embodiments of the present application provide a bracket assembly 100 for supporting an electronic product.

In the embodiment of the present application, the bracket assembly 100 includes a base 10, a first bracket 20, a rotation seat 30 and a second bracket 40. The first bracket 20, the rotation seat 30 and the second bracket 40 are provided on one side of the base 10, the base 10 serves as a support component of the bracket assembly 100 for supporting the first bracket 20, the rotation seat 30 and the second bracket

40. Optionally, the first bracket 20 has an outside wall for contacting a tabletop or a desktop.

In embodiments of the present application, the base 10 is used to connect the electronic device or the support member, so as to facilitate that the electronic device or the support member is fixed to the base 10, which achieves fixing of the electronic device or the support member. Optionally, the base 10 is adsorbed to the mobile phone or electronic tablet by a magnet.

In an embodiment of the present application, the first bracket 20 is swingably mounted to the base 10 and is swingable or foldable relative to the base 10, at this time, the first bracket 20 is provided on an upper side of the base 10, the first bracket 20 is swingably mounted to the base 10 and is swingable or foldable relative to the base 10, so as to facilitate adjusting the position of the first bracket 20 relative to the base 10. An inclined angle is provided between the first bracket 20 and the base 10, such that the first bracket 20 contacts the tabletop or supports the tabletop, thereby facilitating that the bracket assembly 100 contacts the tabletop or supports the tabletop, so as to maintain the inclined state of the bracket assembly 100 and the electronic device connected to the bracket assembly 100. Optionally, the first bracket 20 is mounted to the base 10 via an opening hinge.

In an embodiment of the present application, the rotation seat 30 is rotatably mounted to the base 10 and rotated along the axis of the rotation seat 30, at this time the rotation seat 30 is provided on an inner side of the base 10, and the rotation seat 30 is rotatably mounted to the base 10 and rotated along the axis of the rotation seat 30, so as to facilitate adjusting the position of the rotation seat 30 relative to the base 10, thereby adjusting an axis direction of the rotation seat 30 relative to the base 10.

In an embodiment of the present application, the second bracket 40 is arranged along the axis of the rotation seat 30 relative to the rotation seat 30, and the second bracket 40 is foldably mounted to the rotation seat 30 and is opened or folded relative to the rotation seat 30; when the second bracket 40 is folded relative to the rotation seat 30, the second bracket 40 is fixed to the rotation seat 30 by adsorption force or snap fit force.

At this time, the second bracket 40 is provided on an upper side of the rotation seat 30, the second bracket 40 is foldably mounted to the rotation seat 30 and is opened or folded relative to the rotation seat 30, and when the second bracket 40 is opened relative to the rotation seat 30, the second bracket 40 is held by the user's hand, so as to facilitate the user holding the bracket assembly 100 and the electronic device connected to the bracket assembly 100, whereby the bracket assembly 100 is compatible with the support function of the first bracket 20 and the handhold function of the second bracket 40, which enriches the function of the bracket assembly 100 and satisfies the comprehensive application of the first bracket 20 and the second bracket 40. In addition, when the second bracket 40 is folded relative to the rotation seat 30, the second bracket 40 is fixed to the rotation seat 30 by adsorption force or snap fit force, the folding stability between the second bracket 40 and the rotation seat 30 is ensured.

In an embodiment of the present application, the base 10 is provided with a rotation hole 10a and a through hole 10b, the rotation hole 10a is located on an outside of the through hole 10b and is communicated with the through hole 10b. The rotation seat 30 is located inside the through hole 10b, the rotation seat 30 is connected to the rotation hole 10a, and a gap is provided between the rotation seat 30 and the rotation hole 10a, and the rotation seat 30 is rotatable relative to the rotation hole 10a, and at this time, the rotation hole 10a is located on the outside of the through hole 10b and a diameter of the rotation hole 10a is larger than a diameter of the through hole 10b. The rotation hole 10a is communicated with the through hole 10b, the rotation seat 30 is located inside the through hole 10b, the rotation seat 30 is connected to the rotation hole 10a, and a gap is provided between the rotation seat 30 and the rotation hole 10a, and an outer diameter of the rotation seat 30 is smaller than an inner diameter of the rotation hole 10a, and the rotation seat 30 is rotatable relative to the rotation hole 10a, so as to facilitate the rotation of the rotation seat 30 relative to the base 10 through the through hole 10b, to realize rotation function of the rotation seat 30.

Alternatively, the rotation seat 30 is locate inside the through hole 10b, a rotation bearing is provided between the rotation seat 30 and the rotation hole 10a, the rotation seat 30 rotates relative to the rotation hole 10a through the rotation bearing, and at this time, the rotation bearing is provided between the rotation seat 30 and the base 10, a fixing end of the rotation bearing is connected to the rotation hole 10a, a rotation end of the rotation bearing is connected to the rotation seat 30 to drive the rotation seat 30 to rotate, and the rotation seat 30 is rotated relative to the rotation hole 10a through the rotation bearing, so as to facilitate the rotation of the rotation seat 30 through the rotation bearing.

In an embodiment of the present application, a rotation arm 31 is projected from a peripheral side wall of the rotation seat 30, the rotation arm 31 is inserted into the rotation hole 10a and rotates within the rotation hole 10a. An upper side wall of the rotation arm 31 contacts an inner side wall of the rotation hole 10a, at this time, the rotation arm 31 is located at the peripheral side wall of the rotation seat 30, the rotation arm 31 is inserted into the rotation hole 10a and rotates within the rotation hole 10a, and the upper side wall of the rotation arm 31 contacts the inner side wall of the rotation hole 10a, so as to facilitate that the rotation seat 30 rotates relative to the base 10 through the rotation arm 31, thereby facilitating adjusting the position of the rotation seat 30 relative to the base 10.

When the first bracket 20 is folded relative to the base 10, the first bracket 20 is provided with a through hole 20a, and the second bracket 40 is exposed to the through hole 20a, and at this time the through hole 20a is in the middle of the first bracket 20, the second bracket 40 is located inside the first bracket 20, and the second bracket 40 is exposed to the through hole 20a, so as to facilitate that the second bracket 40 can be opened or folded, and the second bracket 40 is opened or folded relative to the rotation seat 30. When the second bracket 40 is opened relative to the rotation seat 30, the second bracket 40 is held by the user's hand, so as to facilitate the user to hold the bracket assembly 100 and the electronic device connected to the bracket assembly 100, and when the second bracket 40 is folded relative to the rotation seat 30, so as to reduce the longitudinal space between the second bracket 40 and the rotation seat 30, thereby facilitate storage of the bracket assembly 100. Optionally, the first bracket 20 is connected to the base 10 by the magnet. Optionally, the first bracket 20 may be a metal sheet.

In an embodiment of the present application, the first bracket 20 is provided with an operation hole 20b, the operation hole 20b is provided at an outer peripheral side of the through hole 20a, and is communicated with to the through hole 20a. When the first bracket 20 is folded relative to the base 10, an operation space 20c is formed between an inner side wall of the operation hole 20b and an outer peripheral wall of the second bracket 40, and the operation space 20c is used for insertion of the user's hand to open the second bracket 40, and at this time, the operation hole 20b is located on an outer peripheral side of the through hole 20a, and the operation hole 20b is communicated with the through hole 20a, so as to facilitate enlarging an outer diameter of the through hole 20a through the operation hole 20b. When the first bracket 20 is folded relative to the base 10, an operation space 20c is formed between an inner side wall of the operation hole 20b and an outer peripheral wall of the second bracket 40, the operation space 20c is used for insertion of the user's hand to open the second bracket 40, so as to facilitate opening the second bracket 40 by the user's hand through the operation space 20c, realizing the opening of the second bracket 40 relative to the rotation seat 30.

When the first bracket 20 is folded relative to the base 10, the surface of the second bracket 40 does not extend beyond the surface of the first bracket 20 along the axis of the second bracket 40, so as to accommodate the second bracket 40 within the first bracket 20, such that the second bracket 40 and the first bracket 20 are integrated by the bracket assembly 100.

In an embodiment of the present application, the second bracket 40 is provided with a folding member 50 between the second bracket 40 and the rotation seat 30, and two ends of the folding member 50 are connected to the second bracket 40 and the rotation seat 30, respectively. The folding member 50 includes at least one folding arm 51, the folding arm 51 is provided with a first folding portion 511 and a second folding portion 512, the first folding portion 511 is connected to the rotation seat 30, and the second folding portion 512 is connected to the second bracket 40, and the first folding portion 511 and the second folding portion 512 can be folded or opened each other.

At this time, the folding member 50 is located between the second bracket 40 and the rotation seat 30, and the folding member 50 is provided with at least one folding arm 51, and one end of the folding arm 51 is connected to the second bracket 40 and another end of the folding arm 51 is connected to the rotation seat 30, and the second bracket 40 and the rotation seat 30 are folded along with the folding of the folding arm 51, or, the second bracket 40 and the rotation seat 30 are opened along with the opening of the folding arm 51, so that the folding member 50 realizes a folding function or an opening function between the second bracket 40 and the rotation seat 30, and the second bracket 40 and the rotation seat 30 are opened with the opening of the folding arm 51. A handhold space 51a is formed among the second bracket 40, the rotation seat 30 and the folding arm 51, so as to facilitate the user handholding the bracket assembly 100 through the handhold space 51a, to improve the handhold effect of the bracket assembly 100.

The folding arm 51 includes a first folding portion 511 and a second folding portion 512, the first folding portion 511 is located on a lower side of the second folding portion 512, and one end of the first folding portion 511 is connected to the rotation seat 30 and one end of the second folding portion 512 is connected to the second bracket 40, so as to facilitate that the rotation seat 30 fixes the first folding portion 511 and the second bracket 40 fixes the second folding portion 512. The first folding portion 511 and the second folding portion 512 are connected, the first folding portion 511 and the second folding portion 512 are swingable with each other, and the first folding portion 511 and the second folding portion 512 are folded or opened along the axial direction of the rotation seat 30, so as to facilitate the rotation seat 30 and the second bracket 40 to being folded or opened by the first folding portion 511 and the second folding portion 512.

When the folding arm 51 is opened, a bent is formed between the first folding portion 511 and the second folding portion 512. Optionally, the first folding portion 511 and the second folding portion 512 are in a shape of a "less than" or "greater than" character. A handhold space 51a is formed among the first folding portion 511, the second folding portion 512, the rotation seat 30, and the second bracket 40. The handhold space 51a is used for the insertion of the user's hand or clamping, so as to facilitate insertion of the user's hand into the handhold space 51a, thereby facilitating the user handholding the bracket assembly 100, the handhold space 51a has a heterogeneous inner contour.

In the embodiment of the present application, when the folding arm 51 is folded, the rotation seat 30 and the second bracket 40 are folded against each other and subjected to an adsorption force, thus when the folding arm 51 is folded, the rotation seat 30 and the second bracket 40 are folded against each other, such that the rotation seat 30 and the second bracket 40 are close to each other, and the rotation seat 30 and the second bracket 40 are adsorbed to each other by the adsorption force, so that the rotation seat 30 is fixed relative to the second bracket 40 by the adsorption force, to avoid the second bracket 40 from automatically opening relative to the rotation seat 30.

At this time, when there is a magnetic adsorption force between the rotation seat 30 and the second bracket 40, the rotation seat 30 is a metal member, the second bracket 40 is provided with a second connection member 41, the second connection member 41 is magnetically adsorbed with the rotation seat 30, and the second connection member 41 is a magnet, therefore the second connection member 41 is magnetically adsorbed with the rotation seat 30, so as to facilitate making the second bracket 40 and the rotation seat 30 to be subjected to the magnetic adsorption force.

Alternatively, when there is a magnetic adsorption force between the rotation seat 30 and the second bracket 40, the rotation seat 30 is provided with a first connection member 32, the second bracket 40 is provided with a second connection member 41, the first connection member 32 and the second connection member 41 are two magnets that are oppositely attracted to each other, therefore, the second connection member 41 is magnetically adsorbed with the first connection member 32, such that the second bracket 40 and the rotation seat 30 are subjected to the magnetic adsorption force.

In another embodiment of the present application, when there is an adhesive adsorption force between the rotation seat 30 and the second bracket 40, the second bracket 40 is provided with a fourth connection member 42, the fourth connection member 42 is adhesively adsorbed with the rotation seat 30, and the fourth connection member 42 is an adhesive member, therefore, the fourth connection member 42 is adhesively adsorbed with the rotation seat 30, so as to facilitate making the second bracket 40 and the rotation seat 30 to be subjected to the adhesive adsorption force.

Alternatively, when there is an adhesive adsorption force between the rotation seat 30 and the second bracket 40, the rotation seat 30 is provided with a third connection member 33, and the second bracket 40 is provided with a fourth connection member 42, and the third connection member 33 and the fourth connection member 42 are both adhesive members that are attracted to each other, therefore, the fourth connection member 42 is adhesively adsorbed with the third connection member 33, so as to facilitate making the second bracket 40 and the rotation seat 30 to be subjected to the adhesive adsorption force.

In the embodiment of the present application, when the folding arm 51 is folded, the rotation seat 30 and the second bracket 40 are folded into each other and subjected to a snap fit force, therefore when the folding arm 51 is folded, the rotation seat 30 and the second bracket 40 are folded into each other, so as to facilitate making the rotation seat 30 and the second bracket 40 close to each other, and the snap fit force enables the rotation seat 30 and the second bracket 40 to be snapped into each other, so that the rotation seat 30 is fixed relative to the second bracket 40 by the snap fit force, thereby preventing the second bracket 40 from automatically opening relative to the rotation seat 30. Optionally, the rotation seat 30 and the second bracket 40 are snapped through snapping of the snap arm with the snap slot, which is not limited herein.

In another embodiment, an electronic device bracket includes a bracket assembly 100 and an electronic device; the bracket assembly 100 is located on an outside of the electronic device, and a base 10 of the bracket assembly 100 is magnetically or adhesively fixed to the electronic device, so as to facilitate that the electronic device is magnetically or adhesively fixed to the base 10 of the bracket assembly 100, to achieve fixation of the electronic device.

In the technical solution provided in some embodiments of the present application, the bracket assembly 100 is compatible with a first bracket 20 and a second bracket 40, the first bracket 20 is swingably mounted to the base 10 and is swingable or foldable relative to the base 10, such that there is an inclined angle between the first bracket 20 and the base 10, thus the first bracket 20 contacts a tabletop or supports the tabletop, so as to facilitate that the bracket assembly 100 contacts the tabletop or supports tabletop, so as to maintain the inclined state of the bracket assembly 100 and the electronic device connected to the bracket assembly 100. Furthermore, the second bracket 40 achieves a rotation function with the base 10 through the rotation seat 30, so that the second bracket 40 has a rotation function, and the second bracket 40 is foldably mounted to the rotation seat 30 and openable or foldable relative to the rotation seat 30. When the second bracket 40 is opened relative to the rotation seat 30, the second bracket 40 is held by a user's hand, so as to facilitate the user holding the bracket assembly 100 and the electronic device connected to the bracket assembly 100, whereby the bracket assembly 100 is compatible with the support function of the first bracket 20 and the handhold function of the second bracket 40, which enriches the function of the bracket assembly 100 and satisfies the comprehensive application of the first bracket 20 and the second bracket 40. In addition, when the second bracket 40 is folded relative to the rotation seat 30, the second bracket 40 is fixed to the rotation seat 30 by adsorption force or snap fit force, the folding stability between the second bracket 40 and the rotation seat 30 is ensured.

In the above embodiments, the description of each embodiment has its own focus, and the portion not described in detail in an embodiment can be referred to the relevant description of other embodiments.

In the description of the present application, the terms "first" and "second" are used for descriptive purposes only and are not to be understood as indicating or implying relative importance or implicitly specifying the number of technical features indicated. As a result, a feature defined with "first" and "second" may include one or more features, either explicitly or implicitly.

Herein, the principle and implementation of the present application are described by applying specific examples, the description of above examples are only used to help understand the method and the core ideas of the present application, and for those skilled in the art, based on ideas of the present application, there have changes in the specific implementation and the scope of application. In summary, the contents of this specification should not be construed as a limitation on the present application.

What is claimed is:

1. A bracket assembly for supporting an electric device bracket, comprising:
   a base, connecting an electronic device or a support member;
   a first bracket, swingably mounted to the base and swingable or foldable relative to the base;
   a rotation seat, rotatably mounted to the base and rotatable along an axis of the rotation seat; and
   a second bracket, arranged along the axis of the rotation seat relative to the rotation seat, wherein the second bracket is foldably mounted to the rotation seat and openable and foldable relative to the rotation seat, and when the second bracket is folded relative to the rotation seat, the second bracket is fixed to the rotation seat by adsorption force or snap fit force;
   when the first bracket is folded relative to the base, the first bracket is provided with a through hole, and the second bracket is exposed to the through hole, and the second bracket is located inside the first bracket and is opened or folded relative to the rotation seat.

2. The bracket assembly according to claim 1, wherein the base is provided with a rotation hole and a through hole, and the rotation hole is located on an outside of the through hole and communicated with the through hole;
   the rotation seat is located inside the through hole, the rotation seat is connected to the rotation hole, and a gap is provided between the rotation seat and the rotation hole for rotatable relative to the rotation hole; or
   the rotation seat is located inside the through hole, a rotation bearing is provided between the rotation hole and the rotation seat, and the rotation seat is rotatable relative to the rotation hole through the rotation bearing.

3. The bracket assembly according to claim 2, wherein a rotation arm is projected from a peripheral side wall of the rotation seat, the rotation arm is inserted in the rotation hole and rotatable within the rotation hole, and an upper side wall of the rotation arm is contacted with an inner side wall of the rotation hole.

4. The bracket assembly according to claim 1, wherein the first bracket is provided with an operation hole, the operation hole is provided on an outer peripheral side of the through hole and communicated with the through hole; and
   when the first bracket is folded relative to the base, an operation space is formed between an inner side wall of the operation hole and an outer peripheral wall of the second bracket, the operation space is configured for insertion of a user's hand to open the second bracket.

5. The bracket assembly according to claim 1, wherein when the first bracket is folded relative to the base, and a surface of the second bracket extends not beyond a surface of the first bracket along an axis of the second bracket.

6. The bracket assembly according to claim 1, wherein the second bracket is provided with a folding member between the second bracket and the rotation seat, and an end of the folding member is connected to the second bracket and another end of the folding member is connected to the rotation seat;
  wherein the folding member comprises at least one folding arm, each folding arm is provided with a first folding portion and a second folding portion connected to each other, the first folding portion is connected to the rotation seat, and the second folding portion is connected to the second bracket, and the first folding portion and second folding portion are openable or foldable each other.

7. The bracket assembly according to claim 6, wherein when the folding arm is opened, and a bent is formed between the first folding portion and the second folding portion, the first folding portion, the second folding portion, the rotation seat and the second bracket form a handhold space for insertion of a user's hand or clamping the user's hand.

8. The bracket assembly according to claim 6, wherein when the folding arm is folded, the rotation seat and the second bracket are folded to each other and are subjected to adsorption force or snap fit force.

\* \* \* \* \*